(12) United States Patent
Sait

(10) Patent No.: US 10,052,822 B1
(45) Date of Patent: Aug. 21, 2018

(54) SELECTIVE PAUSING OF 3D PRINT JOBS

(71) Applicant: Amazon Technologies, Inc., Reno, NV (US)

(72) Inventor: Abdul Sathar Sait, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 778 days.

(21) Appl. No.: 14/450,127

(22) Filed: Aug. 1, 2014

(51) Int. Cl.
  *B29C 67/00* (2017.01)

(52) U.S. Cl.
  CPC .................. *B29C 67/0088* (2013.01)

(58) Field of Classification Search
  CPC .................................. B29C 67/0088
  USPC ...................................... 700/119
  See application file for complete search history.

(56) References Cited

U.S. PATENT DOCUMENTS

| | | | | |
|---|---|---|---|---|
| 2006/0054039 A1* | 3/2006 | Kritchman | ............... | B29C 41/02 101/424.1 |
| 2006/0059253 A1* | 3/2006 | Goodman | ............... | G06Q 10/10 709/223 |
| 2006/0156978 A1* | 7/2006 | Lipson | ................ | B29C 67/0055 118/708 |
| 2013/0235412 A1* | 9/2013 | Baldwin | ............... | G06F 3/1238 358/1.14 |
| 2014/0039663 A1* | 2/2014 | Boyer | ................ | B29C 67/0051 700/118 |
| 2014/0265034 A1* | 9/2014 | Dudley | ............... | B29C 67/0085 264/401 |
| 2015/0022612 A1* | 1/2015 | Taylor | ................... | B41J 15/044 347/110 |
| 2015/0057784 A1* | 2/2015 | Butler | ................. | B29C 67/0088 700/119 |
| 2015/0170009 A1* | 6/2015 | Cudak | .................... | G06K 15/00 358/1.15 |
| 2015/0197062 A1* | 7/2015 | Shinar | ................. | B29C 67/0088 700/98 |
| 2015/0197063 A1* | 7/2015 | Shinar | ..................... | G06F 17/50 700/98 |
| 2015/0210007 A1* | 7/2015 | Durand | ............... | B29C 67/0051 264/401 |
| 2015/0283760 A1* | 10/2015 | Willis | ................. | B29C 67/0088 700/98 |

OTHER PUBLICATIONS

"CubeX 3D Printing", Google message board, https://groups.google.com/forum/, accessed Jul. 7, 2014; 1 page.

* cited by examiner

*Primary Examiner* — Ziaul Karim
(74) *Attorney, Agent, or Firm* — Baker & Hostetler LLP

(57) ABSTRACT

Techniques are disclosed for selectively pausing and resuming the 3D printing of an object. In embodiments, a request to pause 3D printing is received. A 3D printer may evaluate a material being used to print the object, a process being used to print the object, a current point in the process of 3D printing the object, and other factors, and determine whether to permit pausing the 3D printing process based on this information.

18 Claims, 6 Drawing Sheets

SELECTIVE PAUSING OF 3D PRINT JOBS

BACKGROUND

Printing may include both two-dimensional (2D) printing of text and/or images onto a surface, and three-dimensional (3D) printing of a three-dimensional object.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
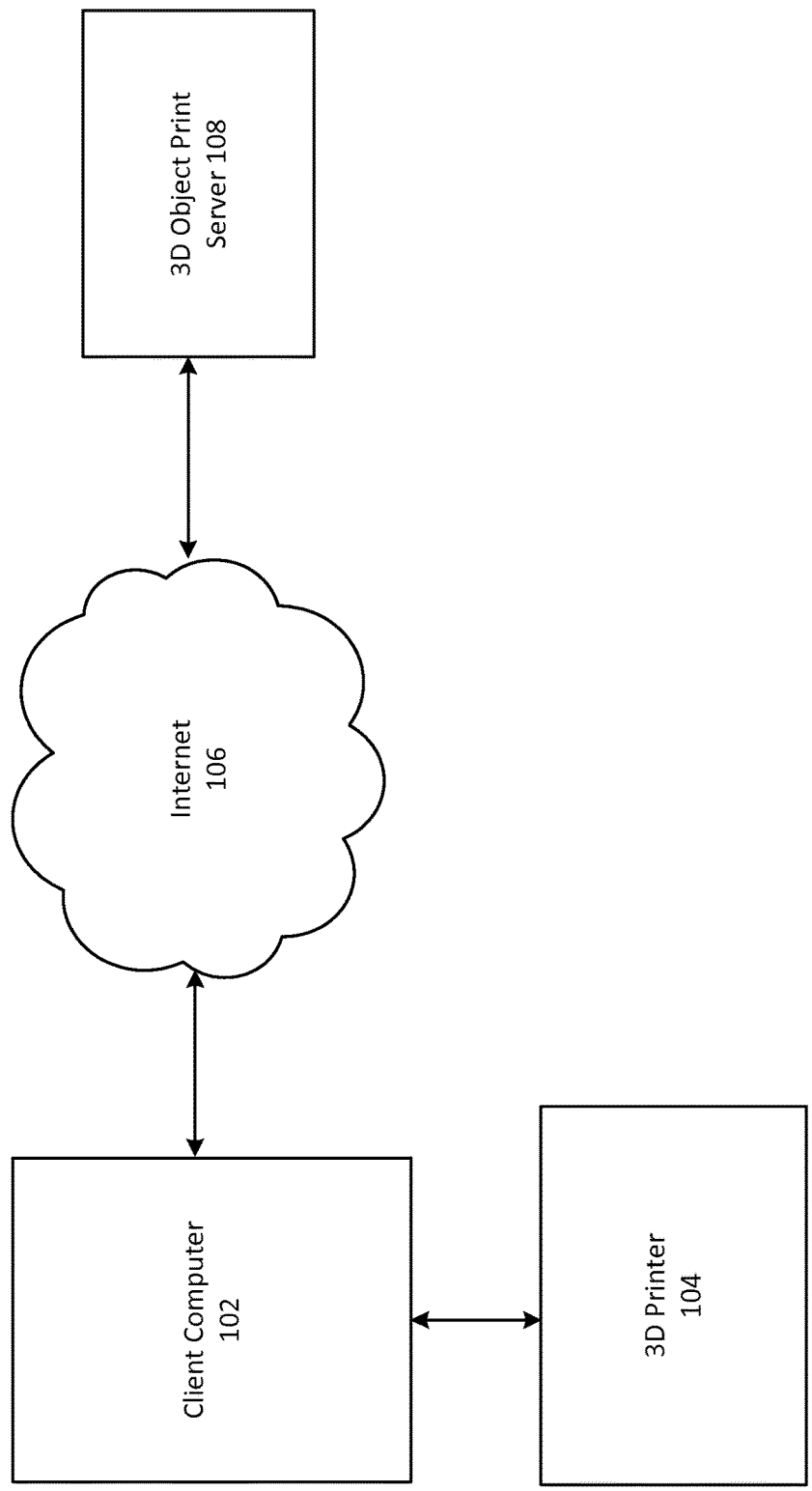
FIG. 1 depicts an example operating environment in which embodiments may be implemented.

Three-dimensional printing (3D printing; sometimes referred to as 3-D printing or 3DP) may be distinguished from 2D printing—like laser printing or ink jet printing in that 3D printing generally involves creating a three-dimensional object, whereas 2D printing generally involves forming an image on a surface (like text). Three-dimensional printing is a form of additive manufacturing where an object may be created by adding material to the object layer by layer (typically, each layer may be approximately 0.1 mm in thickness). Additive manufacturing may also include technologies, such as stereolithography. A close analog of 3D printing involves substractive manufacturing where the processes begins with a larger amount of material than will be in the finished object, and material is removed until the finished object is generated.

Direct 3D printing is one type of 3D printing. Direct 3D printing is similar to 2D inkjet printing, where the printer has nozzles that move and are configured to dispense a fluid, such as a wax or a plastic polymer that will harden into a solid object. Multiple layers are created with this fluid to build the finished object. In embodiments, the nozzles in direct 3D printing are configured to move in two dimensions (e.g., left and right, and up and down). In other embodiments, the platform on which the object rests moves relative to the nozzles, and the nozzles may move in one dimension (e.g., left to right).

Binder 3D printing is another type of 3D printing. Binder 3D printing also uses nozzles to dispense a substance that is used to form multiple layers of an object. In binder 3D printing, two different substances are applied—a dry powder that may be dispensed by a moving roller and a liquid adhesive (a "binder") that may be dispensed by nozzles. Two passes are involved in creating each layer. In the first pass, the roller outputs the powder, and in the second pass, nozzles output the adhesive, which binds the powder to the rest of the object. Binder 3D printing may allow for the use of a wider variety of materials than direct 3D printing, such as some metals or ceramics.

Photopolymerization is another type of 3D printing. In photopolymerization, an ultraviolet laser beam is directed at liquid plastic, which transforms the plastic into a solid. Sintering is also another type of 3D printing where a material is melted and then fused with a previous portion of the object. For example, in selective laser sintering, a laser is used to melt a plastic powder, which is then arranged in the shape of the object (or a layer of the object) and solidifies.

Regardless of which of these types of 3D printing approaches is taken, the process of printing generally adheres to the following path. First, a 3D model of the object to be printed is created in a computer-aided design (CAD) program. Some CAD programs also allow for simulating the object to determine its likely structural integrity given the materials and process used and the shape of the object. Then, the 3D model, in the format of a CAD program, may be converted to a standard tessellation language (STL) format that is commonly understood by 3D printers. Other examples of formats understood by 3D printers include ZPR format and ObiDF format.

Then, the 3D model in a STL format may be transferred to a 3D printer. At the 3D printer, a size for an object printed from the 3D model and an orientation of that object relative to the 3D printer can be selected. The materials to be used to print the object may be added to the printer should the printer not already have a sufficient amount of these materials. Then, the printer may begin printing the object (sometimes referred to as building the object). Once the printer has printed the object, some post-printing activity may take place, such as brushing extraneous, unbound powder from the object, or removing structures that were created during the printing process to add temporary support while the object printed (e.g., by placing the object in water where the supports are water-soluble and will dissipate upon contact with water).

A problem with 3D printing an object is that it may take a long time to print the object. In cases, there may be a desire to pause and then later resume printing an object, such as to begin printing another object for which there is a more pressing need, or because a power outage is anticipated before the object is printed. There are problems with current approaches to pausing because these approaches allow for pausing without considering the particulars of the specific situation under which a particular 3D object is being printed.

For example, 3D printing generally involves applying a heated material, which then cools (or cures) and hardens into the object. Different materials cool at different rates, and whether 3D printing an object may continue once the previously applied layers of material have hardened may affect whether pausing a 3D print job should be allowed. In addition to the material being used, where in a print job the received pause request may affect whether pausing a 3D print job should be allowed. Pausing a 3D print job may cause the structural integrity of the printed object at the paused location to generally be weaker relative to a version of the object that was 3D printed without pausing. This factor may weigh on whether a 3D print job should be paused at a particular point.

Fault tolerance is another factor that may be considered in determining whether to permit pausing a 3D print job. A 3D print job that is paused may generally take longer to complete than a 3D print job of the same object that is not paused. As a 3D print job takes longer, a risk that the alignment of the object relative to the 3D printer may change may increase, and changing the alignment may lead to increased imperfections in the finished object. Where the 3D printed object has a relatively low tolerance for imperfections (e.g., the object to be printed is a key, where a difference in dimension of a small amount may affect whether the key fits a corresponding lock), it may be determined not to permit pausing the 3D printing of the object.

The techniques disclosed herein involve utilizing factors such as these to determine whether to permit pausing a 3D print job. Additionally, there are techniques disclosed herein for optimizing streaming a set of pieces of a 3D print job from a server to a client. It may be that a 3D printer can print an object faster than a corresponding 3D printing template may be sent to it across a communications network, or that the network connection between the streaming server and the 3D printer is unreliable. The streaming server may selectively set an order for streaming the pieces so that pausable pieces may begin printing while unpausable pieces are streamed. That way, the unpausable pieces will be fully downloaded by the 3D printer, so that an interruption in the network connection or a printer that may print faster than a 3D template is received may print the unpausable pieces without interruption. This approach may increase the throughput of a 3D printer.

As used herein, a piece may be considered to be pausable when 3D printing the piece may be suspended and later resumed while still successfully 3D printing the piece. In embodiments, suspending 3D printing the piece may be performed in response to receiving user input requesting to pause 3D printing the piece. In other embodiments, suspending 3D printing the piece may be performed when the 3D printing process is interrupted, such as due to power failure, or when the 3D printing process is using data that is being streamed to it across a communications network, and that no data is received for some period of time.

FIG. 1 depicts an example operating environment in which embodiments may be implemented. As depicted, this operating environment includes client computer 102, which is connected to 3D printer 104. Client computer 102 is also connected to 3D object server 108 through Internet 106, which is a communications network. Each of client computer 102 and 3D object server 108 may be implemented in computer 600 of FIG. 6, which is described in more detail below.

Three-dimensional object server 108 may send a 3D template to client computer 102 across Internet 106. Once received, client computer 102 may instruct 3D printer 104 to print an object corresponding to the received 3D template (not shown). In embodiments, 3D printer 104 may directly connect to Internet 106 and receive 3D templates from 3D object server 108 without intervention by client computer 102. In these embodiments, 3D printer 104 may incorporate aspects of computer 600 of FIG. 6.

In this operating environment of FIG. 1, 3D printer 104 may selectively pause and resume 3D print jobs, such as by implementing the operating procedures of FIGS. 2-3, which are described below. Additionally, 3D object server 108 may selectively order a plurality of pieces of a 3D print job, such as by implementing the operating procedures of FIGS. 4-5, which are described below.

Figure 2:
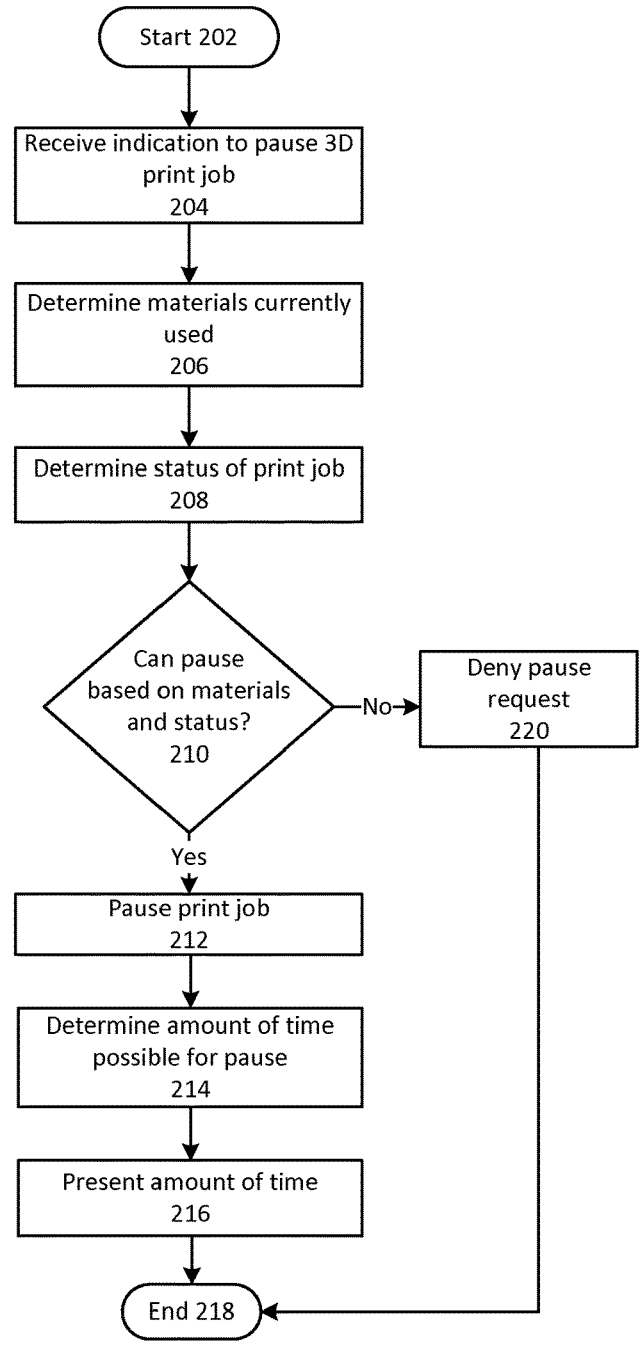
FIG. 2 depicts example operating procedures for selectively pausing a 3D print job.

FIG. 2 depicts example operating procedures for selectively pausing a 3D print job. The operating procedures of FIG. 2 may be implemented by 3D printer 104 as it prints a 3D print job that was received by client computer 102 from 3D object server 108 across Internet 106 and then sent to 3D printer 104. It may be appreciated that there are embodiments that implement more or fewer operations than are depicted in FIG. 2 (and FIGS. 3-5) and/or the operations of FIG. 2 (and FIGS. 3-5) in a different order than are depicted. For instance, there may be embodiments that omit operations 214-216. There may also be embodiments where operation 208 is performed before operation 206.

The operating procedures of FIG. 2 begin with operation 202 and then move to operation 204. Operation 204 depicts receiving an indication to pause a 3D print job. In embodiments, 3D printer 104 may contain a user interface that allows for receiving a pause instruction received from user input, and this pause instruction may be received while the 3D printer is currently printing a 3D print job—after the 3D print job has begun. In other embodiments, 3D printer 104 may receive this pause instruction from client computer 102 or another computer via a communications link that 3D printer 104 uses to communicate with client computer 102 or another computer. After operation 204, the operating procedures of FIG. 2 move to operation 206.

Operation 206 depicts determining materials currently used in printing the 3D print job. For example, an indication of the materials placed in each chamber of the 3D printer may be indicated via user input when those materials are placed in each chamber. In other embodiments, materials may be added to the 3D printer while contained within a container. These containers may contain a RFID (radio-frequency identification) chip or other computer communications device that may be processed by the 3D printer to determine the type of materials contained within the container that are added.

The type of materials currently used (either currently, as in the current layer being added to the object, or currently as in at some point in 3D printing the object) may be factored into a determination of whether a pause instruction should be processed to pause the 3D print job. For example, the materials being used in the particular layer may be difficult to add materials to once they harden, and they may harden at a rapid rate. In such a case, this information may be used to determine that a pause instruction should be carried out where the material used will not adversely impact the ability to resume 3D printing of the object without adversely affecting the object (such as adversely affecting its structural integrity) beyond a predetermined threshold amount. In embodiments, operation 206 may comprise determining a rate at which the material hardens as it cools, and an ability to combine the material when heated with more of the material that is hardened.

In other embodiments, the materials used in 3D printing the object as a whole (and not just at the current layer) may be considered in determining whether to carry out a pause instruction. For example, the materials being used may be relatively expensive (e.g., gold) and be difficult to salvage if the 3D printing fails for an object (e.g., the 3D printer loses the corresponding 3D template, such as due to a corruption of a memory location where the 3D template is stored). In such a case, where pausing 3D printing an object increases the likelihood that 3D printing the object will fail, the cost or availability of the material (e.g., there is not enough of the material available to the 3D printer to make a second attempt to 3D print the object) may be used to determine whether to carry out a pause instruction. After operation 206, the operating procedures of FIG. 2 move to operation 208.

Operation 208 depicts determining a status of the 3D print job. The status of the 3D print job may be a point at which the object is being printed—e.g., if 3D printing the object comprises separately printing 100 layers, a status of the 3D print job may be that layer 30 of 100 is currently being printed. A status of the 3D print job may also identify a fault tolerance for the object as a whole, or the particular place within the 3D print job that the object currently sits.

A status of the 3D print job may identify whether there is DRM (digital rights management) associated with the corresponding 3D template that identifies a number of times that the object may be printed. Where beginning a 3D print job regardless of whether the object is successfully printed counts toward the number of times that the object may be printed, this may weigh against permitting the 3D print job to be paused. A status of the 3D print job may also identify a time at which the 3D printed object is needed. If pausing the 3D print job may cause the object not to be ready by that time, this may weigh against permitting the 3D print job to be paused. After operation 208, the operating procedures of FIG. 2 move to operation 210.

Operation 210 depicts determining whether the 3D print job can be paused based on the materials being used (as determined in operation 206) and the status of the 3D print job (as determined in operation 208). In embodiments, where any factor is beyond its corresponding predetermined threshold limit (e.g., there is not enough remaining material to attempt to 3D print the object a second time, DRM restricts an additional attempt to 3D print the object; or 3D printing the object is currently at a place where pausing printing is likely to negatively impact the structural integrity of the finished object beyond a predetermined threshold amount), it may be determined that the 3D print job cannot be paused at the current time.

In embodiments, operation 210 may comprise determining whether 3D printing the object may be paused based at least in part on where in a process of being printed the object is, a material used in 3D printing the object, a type of 3D printing process being used, a fault tolerance of the object being 3D printed, or an indication contained within a 3D template from which the object is being 3D printed. In other embodiments, operation 210 may comprise determining whether 3D printing the object may be paused based at least in part on a characteristic of the object being 3D printed, a material being used to 3D print the object, or a characteristic of a 3D printer being used to 3D print the object.

In embodiments, operation 210 may also comprise determining whether to pause based on the technique used by the 3D printer—e.g., a direct 3D printing technique, a binder 3D printing technique, a photopolymerization technique, or a sintering technique. In other embodiments, operation 210 may also comprise determining whether to pause based on an effect on a structural integrity of the object associated with pausing 3D printing of the object at a current progress in printing the object. In more embodiments, operation 210 may also comprise determining whether to pause based on a predetermined fault tolerance associated with the object deviating from a specification set forth in a corresponding 3D template.

Where in operation 210 it is determined that the 3D print job can be paused based on the materials being used and the status of the print job, the operating procedures of FIG. 2 move to operation 212. Instead, where in operation 210 it is determined that the 3D print job cannot be paused based on the materials being used and the status of the print job, the operating procedures of FIG. 2 move to operation 220.

Operation 212 is reached where in operation 210 it is determined that the 3D print job can be paused based on the materials being used and the status of the print job. Operation 212 depicts pausing the 3D print job. This may comprise immediately ceasing to print the 3D print job (such as by ceasing to dispense the materials used to create the object from nozzles of the 3D printer). In other embodiments, this may comprise ceasing to print the 3D print job once a nearest stopping point has been reached, such as when a current layer of a plurality of layers of the object has been printed. After operation 212, the operating procedures of FIG. 2 move to operation 214.

Operation 214 depicts determining an amount of time that it is possible to pause the 3D print job. This determination may be made on a rate at which the material being used to print the current and/or previous layer(s) hardens, and a point at which the material being used hardens too much to resume the 3D print job past a threshold likelihood of success in 3D printing the object. In embodiments, this may be referred to as determining an amount of time that 3D printing the object may be paused for based on a property of at least one material used to 3D print the object In other embodiments, historical information may be used—e.g., 3D print jobs for this object, or using this material, or 3D print jobs on this printer in general have a 90% chance of success when paused for fewer than 15 minutes, a 50% chance of success when paused for 15 minutes to one hour, and a 10% chance of success when paused for over one hour. This historical information may be compared to a tolerance for this 3D print job succeeding or failing (e.g., the 3D printer does not have enough remaining material to make a second attempt to 3D print the object) to determine a maximum amount of time that it is possible to pause this 3D print job. After operation 214, the operating procedures of FIG. 2 move to operation 216.

Operation 216 depicts presenting the amount of time that it is possible to pause the 3D print job. This may comprise presenting the amount of time determined in operation 214 on a user interface of 3D printer 104, or sending an indication of this amount of time to client computer 102 and for client computer 102 to display it in a user interface. In embodiments, this presented amount of time may count down until it expires. After operation 216, the operating procedures of FIG. 2 move to operation 218, where the operating procedures of FIG. 2 end.

Operation 220 is reached where in operation 210 it is determined that the 3D print job cannot be paused based on the materials being used and the status of the print job. Operation 220 depicts denying the request to pause the 3D print job. This may comprise continuing to 3D print the object, and sending an indication that the 3D print job will not be paused to a user interface on 3D printer 104 or client computer 102 for display to a user.

In embodiments where pausing may be permitted at a later point in the 3D printing process (e.g., pausing at the current point would likely negatively impact the structural integrity of the object, but pausing at a later point in the 3D print job would likely have little impact on the structural integrity of the object), this indication may include an identification that pausing at a later point will be permitted, an indication of an estimate of how much time will elapse until that point is reached, and an option to set the 3D print job to pause at that future point. In other embodiments, in lieu of providing the user with a dialogue to select pausing the 3D print job at this future time, the 3D printer may directly set the 3D print job to pause at this future time, and provide the user with a message indicative of this. After operation 220, the operating procedures of FIG. 2 move to operation 218, where the operating procedures of FIG. 2 end.

Figure 3:
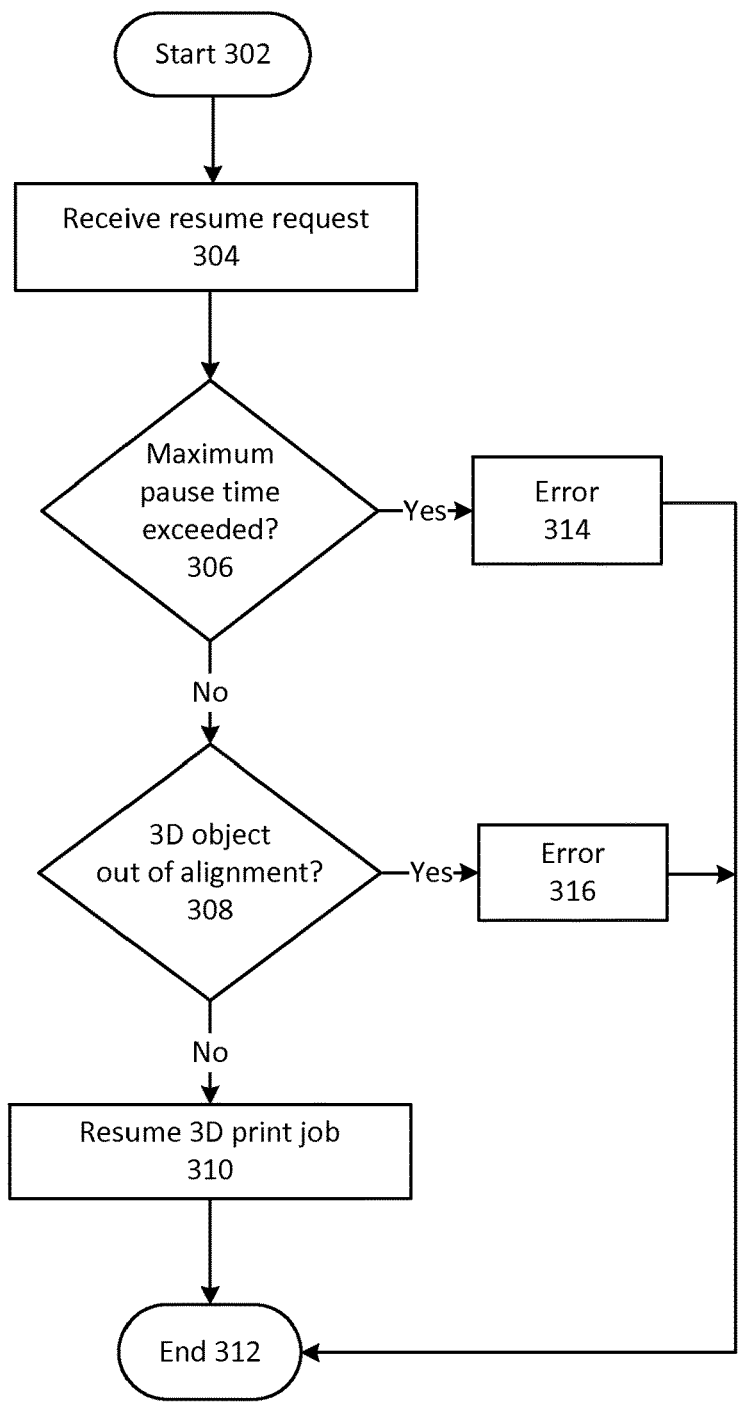
FIG. 3 depicts example operating procedures for selectively resuming a paused 3D print job.

FIG. 3 depicts example operating procedures for selectively resuming a paused 3D print job. The operating procedures of FIG. 3 may be implemented by 3D printer 104 as it prints a 3D print job that was received by client computer 102 from 3D object server 108 across Internet 106 and then sent to 3D printer 104. The operating procedures of FIG. 3 may be implemented to resume a 3D print job after it has been paused during the operating procedures of FIG. 2.

The operating procedures of FIG. 3 begin with operation 302 and move to operation 304. Operation 304 depicts receiving a request to resume a paused 3D print job. This may comprise receiving user input indicative of a request to resume the paused 3D print job at a user interface of 3D printer, or via a communications channel of 3D printer where the request is received from client computer 102 or another computer. After operation 304, the operating procedures of FIG. 3 move to operation 306.

Operation 306 depicts determining whether a maximum amount of time that the 3D print job may be paused has been exceeded. In embodiments, this maximum amount of time that the 3D print job may be paused may be the amount of time determined in operation 214 of FIG. 2 when the 3D print job was originally paused. In embodiments, operation 306 may comprise determining to resume 3D printing the object when a request to resume 3D printing the object is received within the amount of time that 3D printing the object may be paused for.

Where in operation 306 it is determined that the maximum amount of time that the 3D print job may be paused has not been exceeded, the operating procedures of FIG. 3 move to operation 308. Instead, where in operation 306 it is determined that the maximum amount of time that the 3D print job may be paused has been exceeded, the operating procedures of FIG. 3 move to operation 314.

Operation 308 is reached from operation 306, where it is determined that the maximum amount of time that the 3D print job may be paused has not been exceeded. Operation 308 depicts determining whether the 3D print job is out of alignment. While paused, the object being 3D printed may have moved relative to the 3D printer. For example, the 3D printer may have been moved, or bumped, and this may have caused the position of the object to change relative to the 3D printer. Where the alignment of the object has changed, this may result in the 3D printer being unable to continue printing the object because it lacks the ability to update how it will print the template as the object relative to this new position, or because it is physically incapable of continuing to print the object in this new position (e.g., the object is partially off the base of the 3D printer where objects are printed to, and the 3D printer's nozzles cannot disperse material to this new location). Where in operation 308 it is determined that the 3D print object is in alignment, the operating procedures of FIG. 3 move to operation 310. Instead, where in operation 308 it is determined that the 3D print object is out of alignment, the operating procedures of FIG. 3 move to operation 316.

Operation 310 is reached from operation 308, where it is determined that the 3D object is in alignment. Operation 310 depicts resuming the 3D print job. This may comprise continuing to print the object as specified in the corresponding 3D template. In embodiments, the 3D printer may alter the 3D print job based on the 3D print job having been paused. For example, where the material has hardened and therefore has lost some binding characteristics, an adhesive may be applied to the previously printed layer of the object before a new layer is applied.

In other embodiments, the 3D printer may reheat the previously printed layer so that it softens before printing the next layer in the 3D print job. Operation 310 may also comprise providing an indication to a user interface that the 3D print job is being resumed, such as displaying a message in a user interface of 3D printer 104. After operation 310, the operating procedures of FIG. 3 move to operation 312, where the operating procedures of FIG. 3 end.

Operation 314 is reached from operation 306, where it is determined that the maximum amount of time that the 3D print job may be paused has been exceeded. Operation 314 depicts raising an error. This may comprise providing an indication to a user interface, such as a user interface of 3D printer 104, that the 3D print job will not be resumed because a predetermined threshold amount of time since the 3D print job was most recently paused has been exceeded, and that the 3D print job will not be resumed. Then, the 3D printer may refrain from resuming the 3D print job. After operation 314, the operating procedures of FIG. 3 move to operation 312, where the operating procedures of FIG. 3 end.

Operation 316 is reached from operation 308, where it is determined that the 3D object is out of alignment. Operation 316 depicts raising an error. This may comprise providing an indication to a user interface, such as a user interface of 3D printer 104, that the 3D print job will not be resumed because the object is out of alignment, and that the 3D print job will not be resumed. Then, the 3D printer may refrain from resuming the 3D print job. Where the object is later moved back into alignment relative to the 3D printer, a future request to resume the 3D print job may be carried out where the maximum amount of time allowed to pause the 3D print job (as described in operation 306) has not been exceeded. In other embodiments, operation 316 may comprise raising an alert that indicates to a user of the 3D printer that the object is out of alignment and asking for confirmation to continue printing the object while it is out of alignment. In embodiments, various of the other operations that depict raising an error may also comprise raising an alert comprising a dialog to a user that asks for confirmation that the user does wish to continue given the current circumstances (e.g., that the allowable time for pausing has been exceeded). After operation 316, the operating procedures of FIG. 3 move to operation 312, where the operating procedures of FIG. 3 end.

Figure 4:
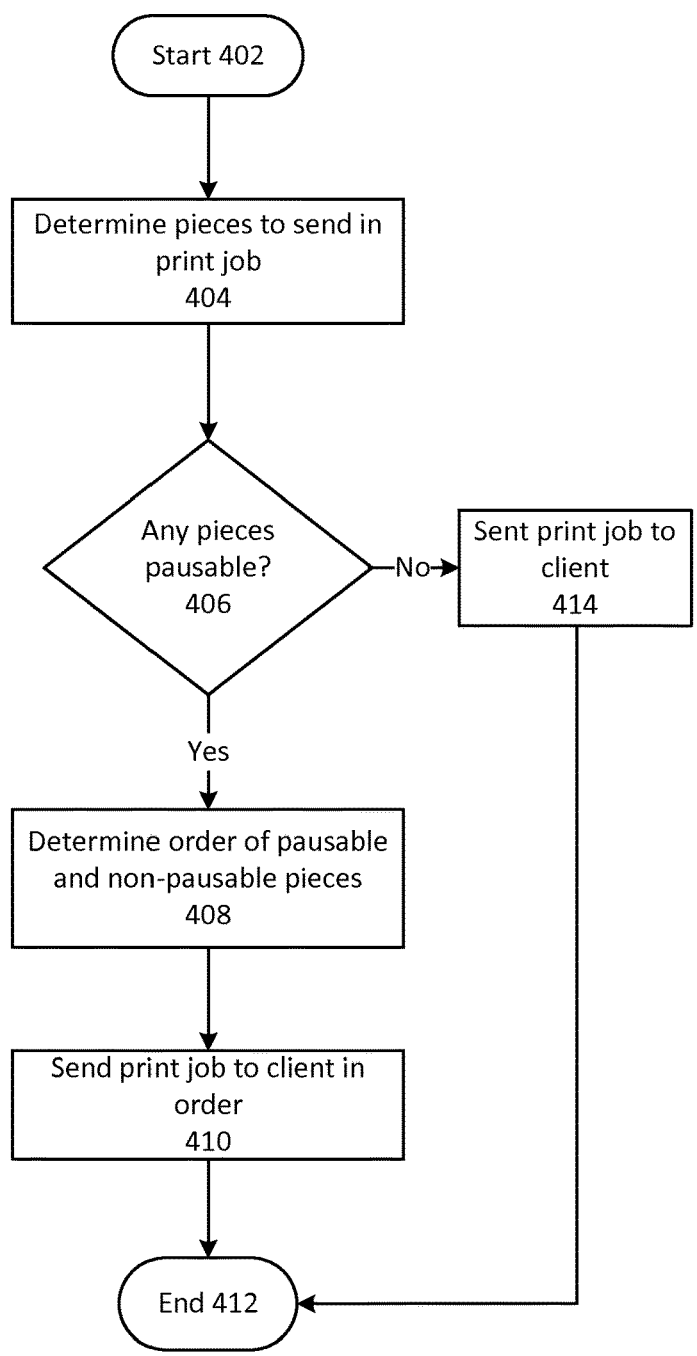
FIG. 4 depicts example operating procedures for streaming a 3D print job that may comprise a combination of pausable and non-pausable objects.

FIG. 4 depicts example operating procedures for streaming a 3D print job that may comprise a combination of pausable and non-pausable objects. In embodiments, the operating procedures of FIG. 4 may be implemented by 3D object server 108 of FIG. 1 as it streams a 3D print job to client computer 102 across Internet 106, and client computer 102 prints the 3D print job at 3D printer 104.

The operating procedures of FIG. 4 begin with operation 402 and move to operation 404. Operation 404 depicts determining the pieces to be sent as part of a print job. This may comprise parsing one or more 3D template files that comprise the print job to determine a number and identification of one or more objects identified by the 3D template(s). In other embodiments, a 3D print job may contain separate metadata that indicates a number and identification of the one or more objects that make up the 3D print job, and this separate metadata may be accessed in the course of implementing operation 404. In embodiments, operation 404 may comprise determining at least two pieces of the plurality of pieces in the 3D print job to be sent to the 3D printer across a communications network. After operation 404, the operating procedures of FIG. 4 move to operation 406.

Operation 406 depicts determining whether any pieces of the 3D print job are pausable. In embodiments, this may comprise performing the operating procedures of FIG. 2 on each object (ignoring aspects that relate to a current position in the print job, since the objects are not currently being printed) to determine whether they are pausable. In other embodiments, there may be metadata that accompanies the 3D print job that indicates whether each piece is pausable and this information may be accessed in the course of implementing operation 406. Where in operation 406 it is determined that at least one piece of the 3D print job is pausable, the operating procedures of FIG. 4 move to operation 408. Instead, where in operation 406 it is determined that no pieces of the 3D print job is pausable, the operating procedures of FIG. 4 move to operation 414.

Operation 408 is reached from operation 406, where it is determined that at least one piece of the 3D print job is pausable. Operation 408 depicts determining an ordering of pausable and non-pausable pieces of the 3D print job. In embodiments, this ordering may be an ordering in which the pieces are transmitted to a 3D printer, like 3D printer 104, or a computer communicatively coupled to a 3D printer, like client computer 102. In some embodiments, the pieces may be sent in strict series (e.g., all of one piece is transmitted before transmission of another piece begins). In other embodiments, pieces may be transmitted in parallel or a combination of series and parallel (e.g., there are 10 pieces to be transmitted, and two pieces are transmitted in parallel at a time until all pieces are transmitted).

This ordering determined in operation 408 may comprise either or both an ordering of the pieces themselves and a determination of whether to transmit the pieces in series or parallel (and if they are to be transmitted in parallel, how many pieces at a time are to be transmitted in parallel). In embodiments, operation 408 may comprise determining an order to send data corresponding to the at least two pieces based at least in part on whether at least one piece of the at least two pieces may be paused while it is being printed by the 3D printer. In embodiments, determining the order may comprise determining the order to send data corresponding to the at least two pieces based on an amount of available bandwidth between the computing device and the 3D printer, an amount of data corresponding to at least one piece of the at least two pieces, or an amount of time calculated to print at least one piece of the at least two pieces with the 3D printer.

In other embodiments, an order, or a partial order (e.g., piece A must be transmitted before piece D, but otherwise the order is optional) may be specified by a designer of the 3D model file(s) for the pieces or another entity that manages these 3D model file(s), either by embedding this information within the 3D model file(s) or by providing metadata that may accompany the 3D model file(s). In other embodiments, user input from a user 3D printing the pieces may be used to determine all or part of an order. For example, a user may be aware that his or her particular 3D printer is prone to overheating and when it overheats, the currently printed piece fails. So, the user may select an order where more important pieces, or pieces for which there are not enough materials to make a second attempt at printing are printed early, so they are likely to be printed before the 3D printer overheats. Or, the user may be aware that his or her network connection to his or her 3D printer is prone to losing connectivity, so may set an order such that unpausable pieces are fully downloaded before the printing process of those pieces begins. After operation 408, the operating procedures of FIG. 4 move to operation 410.

Operation 410 depicts sending the 3D print job to the client in the order determined in operation 408. This may comprise, for example, 3D object server 108 transmitting the 3D template files corresponding to the pieces in the order determined in operation 408 to client computer 102 across Internet 106, so that client computer 102 may direct 3D printer 104 to print these pieces of the 3D print job. In embodiments, operation 410 may comprise sending the data corresponding to the at least two pieces to the 3D printer based on the determined order.

In embodiments, operation 410 may also comprise re-sending one or more pieces of the 3D print job to the 3D printer. This may occur in response to receiving an indication from the 3D printer that the 3D printer lost or did not receive data corresponding to a first object of the at least two objects. Reasons why the 3D printer may request that all or part of the 3D print job be re-sent may include: the 3D printer losing power during transmission of the data of the 3D print job or in a manner that caused the 3D printer to lose a stored version of all or part of the 3D print job, the 3D printer losing network connectivity to the server while the 3D print job is being transmitted, or the 3D printer otherwise losing a stored copy of all or part of the 3D print job (e.g., a part of the 3D printer's local memory used to store the 3D print job became corrupted). After operation 410, the operating procedures of FIG. 4 move to operation 412, where the operating procedures of FIG. 4 end.

Operation 414 is reached from operation 406, where it is determined that no piece of the 3D print job is pausable. Operation 414 depicts sending the print job to the client. That is, the 3D print job may be transmitted to the destination computer without regard to the order of the pieces. Operation 414 may also occur, in embodiments, where every piece of the 3D print job is pausable, so that there is no distinguishing to be made between pausable and unpausable pieces, since only pausable pieces or only unpausable pieces exist in the 3D print job.

In other embodiments, an ordering may still be made when transmitting the 3D print job in operation 414. For example, a piece that requires relatively little data to transmit may be sent first so that the 3D printing may begin as quickly as possible. This may increase the throughput of the 3D print job. After operation 414, the operating procedures of FIG. 4 move to operation 412, where the operating procedures of FIG. 4 end.

Figure 5:
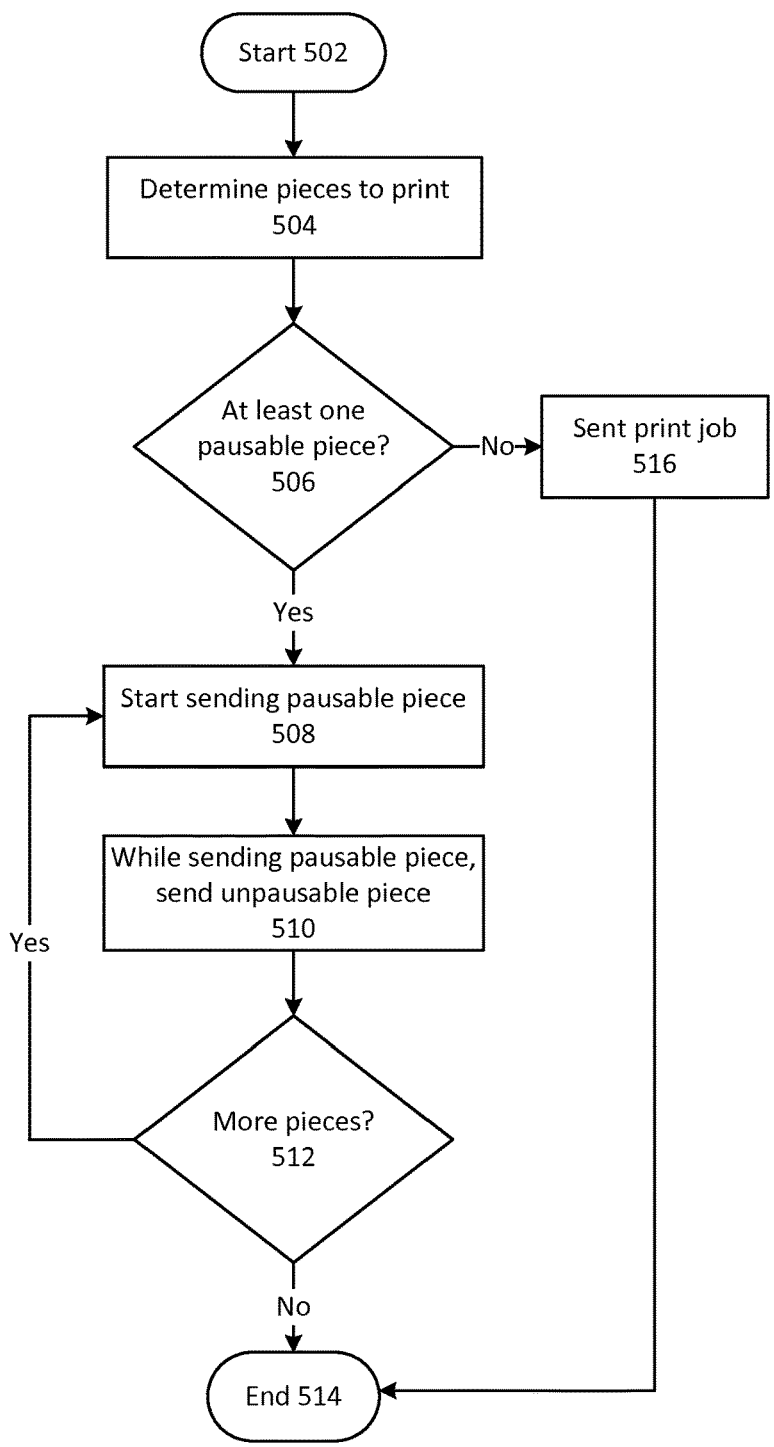
FIG. 5 depicts additional example operating procedures for streaming a 3D print job that may comprise a combination of pausable and non-pausable objects.

FIG. 5 depicts additional example operating procedures for streaming a 3D print job that may comprise a combination of pausable and non-pausable objects. As with FIG. 4, in embodiments, the operating procedures of FIG. 4 may be implemented by 3D object server 108 of FIG. 1 as it streams a 3D print job to client computer 102 across Internet 106, and client computer 102 prints the 3D print job at 3D printer 104. The operating procedures of FIGS. 4-5 both concern streaming a 3D print job that may comprise a combination of pausable and non-pausable objects. A difference between the two is that the operating procedures of FIG. 4 concern ordering a plurality of pieces of a 3D print job that is being transmitted across a computer network. In contrast, the operating procedures of FIG. 5 concern simultaneously transmitting a plurality of 3D printing templates of a plurality of pieces of a 3D print job that is being transmitted across a computer network.

The operating procedures of FIG. 5 begin with operation 502 and move to operation 504. Operation 504 depicts determining the pieces of the 3D print job to be printed. In embodiments, operation 504 may be implemented in a similar manner as operation 404 of FIG. 4. After operation 504, the operating procedures of FIG. 5 move to operation 506.

Operation 506 depicts determining whether the pieces of the 3D print job to be printed identified in operation 504 include at least one pausable piece. In embodiments, operation 506 may be implemented in a similar manner as operation 406 of FIG. 4. Where in operation 506 it is determined that the pieces of the 3D print job to be printed identified in operation 504 include at least one pausable piece, the operating procedures of FIG. 5 move to operation 508. Instead, where in operation 506 it is determined the pieces of the 3D print job to be printed identified in operation 504 include no pausable pieces, the operating procedures of FIG. 5 move to operation 516.

Operation 508 is reached either from operation 506, where it is determined the pieces of the 3D print job to be printed identified in operation 504 include at least one pausable piece, or from operation 512, where it is determined that there are additional pieces of the 3D print job to be transmitted as part of streaming the 3D print job. Operation 508 depicts beginning to send a pausable piece of the plurality of pieces of the 3D print job. This may comprise, for example, 3D object server 108 of FIG. 1 beginning to transmit the data associated with a 3D template file of this pausable piece to client computer 102 of FIG. 1 across Internet 106. After operation 508, the operating procedures of FIG. 5 move to operation 510.

Operation 510 depicts, while sending the pausable piece in operation 508, also sending an unpausable piece. Operation 510 may be implemented in a similar manner as operation 508, but regarding an unpausable piece rather than a pausable piece. This may be effectuated by sending the data for both the pausable piece and the unpausable piece over the same connection (e.g., where the server and client each use one port for the data of the two pieces), interleaved, or by the server and client establishing a second data connection (e.g., where the client and server each use a separate port for the second data connection). After operation 510, the operating procedures of FIG. 5 move to operation 512.

Operation 512 depicts whether there are additional pieces of the 3D print job to send. In embodiments, operation 512 may begin only after one of the currently transmitted pieces has finished being transmitted. It may also be appreciated that, while the operating procedures of FIG. 5 depict two pieces being transmitted in parallel—one pausable piece and one unpausable piece—that there are embodiments where more than two pieces may be transmitted in parallel, and this may comprise any combination of pausable and unpausable pieces.

In embodiments, operation 512 may comprise tracking which pieces have been sent or are currently being sent and determining if there are any remaining pieces that have neither been transmitted already nor are in the process of being transmitted. Where in operation 512 it is determined that there are additional pieces of the 3D print job to send, the operating procedures of FIG. 5 return to operation 508.

While operation 508 depicts starting to send a pausable piece, the loop of operations 508-512 may more generally be considered a loop whereby the pieces of the 3D print job are selectively transmitted in parallel based on their characteristics, such as whether they are pausable or not, or the amount of data to be transmitted for each piece (which affects how long it takes to transmit the data for the piece). This is one embodiment that is depicted for clarity. It may be appreciated that there are embodiments that operate on various combinations of pausable and unpausable pieces in a 3D print job, and embodiments do not require exactly sending one pausable piece and then sending one unpausable piece in parallel (which would imply that an unpausable piece cannot be transmitted unless there is a corresponding pausable piece that is already in the process of being transmitted). In embodiments, this sending of pieces in parallel may comprise sending the 3D printer data corresponding to an unpausable piece of the plurality of pieces while sending the 3D printer data corresponding to a pausable piece of the plurality of pieces: the 3D printer queuing the data corresponding to the unpausable piece while 3D printing the pausable piece.

This loop that involves sending pieces in parallel may be used to increase throughput of the 3D printer. For example, it may be that pausable pieces are printed as soon as they are streamed to the 3D printer, and that the 3D printer waits to begin printing unpausable pieces until it has received an entire unpausable piece. In embodiments, this aspect may comprise sending the 3D printer data corresponding to a pausable piece of the plurality of pieces, the 3D printer beginning to print the pausable piece before sending the 3D printer the data corresponding to the pausable piece is completed. In other embodiments, this may comprise sending the 3D printer data corresponding to an unpausable piece of the plurality of pieces, the 3D printer waiting to begin to print the unpausable piece until after sending the 3D printer the data corresponding to the unpausable piece is completed.

Reasons for delaying the printing of the unpausable object until the entire data has been received may include: a lack of reliability of a network connection over which the data is transmitted; a time at which the unpausable piece is to be printed by, where a failure in printing the piece due to the piece being unpausable (e.g., the 3D printer prints faster than corresponding data is received) would cause a subsequent retry to print the piece to finish after the due time, where the materials are expensive so as to make a failed attempt to print the piece cost prohibitive, or where the 3D printer lacks sufficient material to print much more than one copy of the piece. That is, in embodiments, sending the 3D printer data corresponding to an unpausable piece of the plurality of pieces, the 3D printer waits to begin to print the unpausable piece until after sending the 3D printer the data corresponding to the unpausable piece is completed, based at least in part on a determination of an amount of time involved with printing the unpausable piece; a reliability of a network connection between the computing device and the 3D printer; a time at which printing the unpausable piece is to be completed; a cost of a material associated with printing the unpausable piece; or an availability of the material associated with printing the unpausable piece.

Instead, where in operation 512 it is determined that there are no additional pieces of the 3D print job to send, the operating procedures of FIG. 5 move to operation 514, where the operating procedures of FIG. 5 end.

Operation 516 is reached from operation 506, where it is determined that the pieces of the 3D print job to be printed, as identified in operation 504, include no pausable pieces. Operation 516 depicts sending the print job. In embodiments, operation 516 may be implemented in a similar manner as operation 414 of FIG. 4. After operation 516, the operating procedures of FIG. 5 move to operation 514, where the operating procedures of FIG. 5 end.

Figure 6:
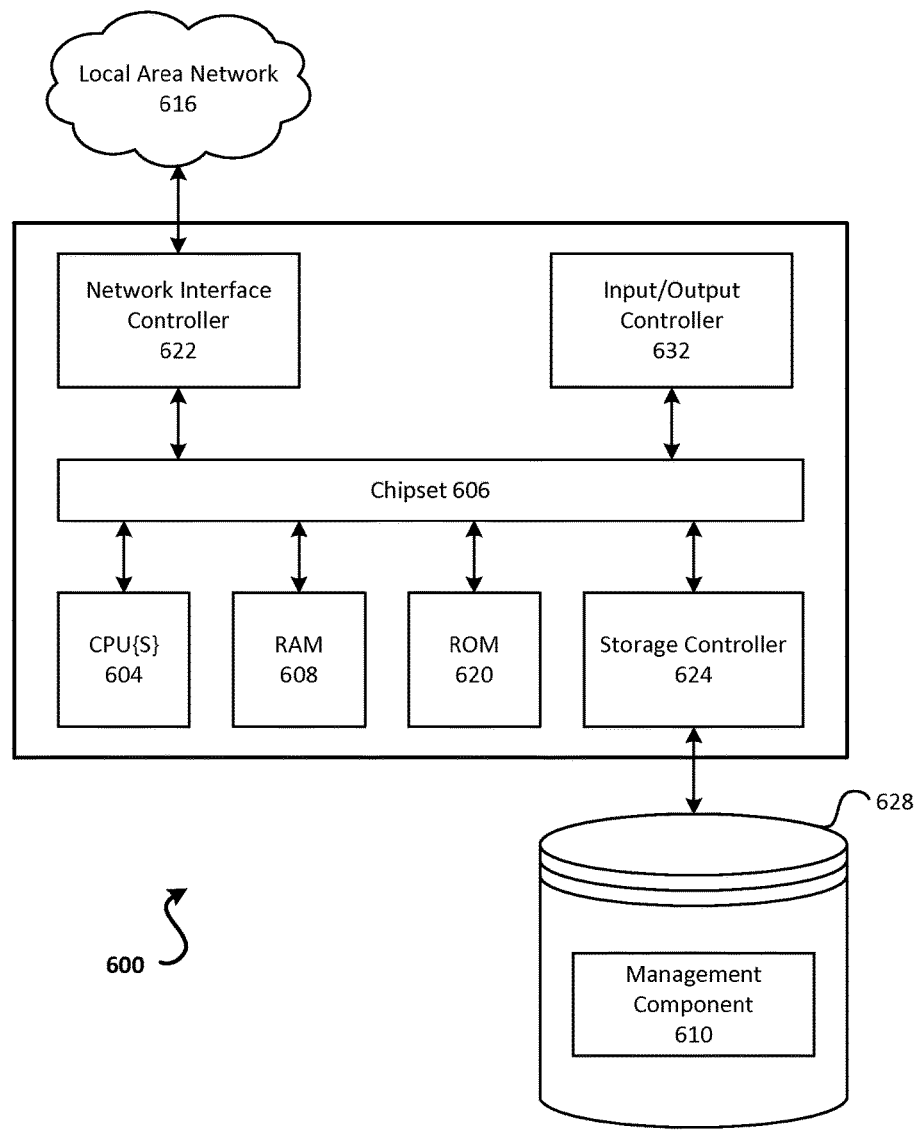
FIG. 6 depicts a computer that may be used in embodiments, such as the computer depicted in FIG. 1.

FIG. 6 depicts a computer that may be used in embodiments, such as the computers depicted in FIG. 1. With regard to the example architecture of FIG. 1, client computer 102 and 3D object server 108 may each be implemented in an instance of computer 600 of FIG. 6.

The computer architecture shown in FIG. 6 illustrates a conventional server computer, workstation, desktop computer, laptop, tablet, network appliance, PDA, e-reader, digital cellular phone, or other computing node, and may be utilized to execute any aspects of the computers described herein, such as to implement the operating procedures of FIGS. 2-5.

Computer 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. CPUs 604 may be standard programmable processors that perform arithmetic and logical operations necessary for the operation of computer 600.

CPUs 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 606 may provide an interface between CPUs 604 and the remainder of the components and devices on the baseboard. Chipset 606 may provide an interface to a random access memory (RAM) 608 used as the main memory in computer 600. Chipset 606 may further provide an interface to a computer-readable storage medium, such as a read-only memory (ROM) 620 or non-volatile RAM (NVRAM) (not shown), for storing basic routines that may help to start up computer 600 and to transfer information between the various components and devices. ROM 620 or NVRAM may also store other software components necessary for the operation of computer 600 in accordance with the embodiments described herein.

Computer 600 may operate in a networked environment using logical connections to remote computing nodes and computer systems through local area network (LAN) 616. Chipset 606 may include functionality for providing network connectivity through a network interface controller (NIC) 622, such as a gigabit Ethernet adapter. NIC 622 may be capable of connecting the computer 600 to other computing nodes over LAN 616. It should be appreciated that multiple NICs 622 may be present in computer 600, connecting the computer to other types of networks and remote computer systems.

Computer 600 may be connected to a mass storage device 628 that provides non-volatile storage for the computer. Mass storage device 628 may store system programs, application programs, other program modules, and data, which have been described in greater detail herein. Mass storage device 628 may be connected to computer 600 through a storage controller 624 connected to chipset 606. Mass storage device 628 may consist of one or more physical storage units. Storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 600 may store data on mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 628 is characterized as primary or secondary storage and the like.

For example, computer 600 may store information to mass storage device 628 by issuing instructions through storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 600 may further read information from mass storage device 628 by detecting the physical states or characteristics of one or more particular locations within the physical storage units.

In addition to mass storage device 628 described above, computer 600 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 628 may store an operating system utilized to control the operation of the computer 600. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 628 may store other system or application programs and data utilized by computer 600, such as management component 610 and/or the other software components described above.

Mass storage device 628 or other computer-readable storage media may also be encoded with computer-executable instructions, which, when loaded into computer 600, transforms the computer from a general-purpose computing system into a special-purpose computer capable of implementing the embodiments described herein. These computer-executable instructions transform computer 600 by specifying how CPUs 604 transition between states, as described above. Computer 600 may have access to computer-readable storage media storing computer-executable instructions, which, when executed by computer 600, may perform operating procedures depicted in FIGS. 2-5.

Computer 600 may also include an input/output controller 632 for receiving and processing input from a number of input devices, such as a keyboard, a mouse, a touchpad, a touch screen, an electronic stylus, or other type of input device. Similarly, input/output controller 632 may provide output to a display, such as a computer monitor, a flat-panel display, a digital projector, a printer, a plotter, or other type of output device. It will be appreciated that computer 600 may not include all of the components shown in FIG. 6, may include other components that are not explicitly shown in FIG. 6, or may utilize an architecture completely different than that shown in FIG. 6.

As described herein, a computing node may be a physical computing node, such as computer 600 of FIG. 6. A computing node may also be a virtual computing node, such as a virtual machine instance, or a session hosted by a physical computing node, where the computing node is configured to host one or more sessions concurrently.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for selectively pausing a process of three-dimensional (3D) printing of an object, comprising:
    at least one processor; and
    at least one memory bearing instructions that, upon execution by the at least one processor, cause the system at least to:
    while the object is being 3D printed according to the process, receive an input indicative of a request to pause 3D printing the object;
    determine whether the process of 3D printing the object may be paused based at least in part on where in the process of being printed the object is, a material used in 3D printing the object, a type of 3D printing process being used, a fault tolerance of the object being 3D printed, or an indication contained within a 3D template from which the object is being 3D printed;
    wherein determining whether the process of 3D printing the object may be paused based at least in part on the material being used to 3D print the object comprises: determining whether the process of 3D printing the object may be paused based at least in part on at least one of the 3D printer using a direct 3D printing technique, a binder 3D printing technique, a photopolymerization technique, or a sintering technique, and wherein determining whether the process of 3D printing the object may be paused based at least in part on the material being used to 3D print the object comprises: determining whether the process of 3D printing the object may be paused based at least in part on a rate at which the material hardens as it cures, and an ability to combine the material when heated with more of the material that is hardened;
    after a determination that the process of 3D printing the object may be paused, pause the process of 3D printing the object; and
    after a determination that 3D printing the object may not be paused, continue to 3D print the object according to the process.

2. The system of claim 1, wherein the at least one memory further bears instructions that, upon execution by the at least one processor, causes the system at least to:
    determine an amount of time that 3D printing the object may be paused for based on a property of the material used to 3D print the object; and
    resume the process when a request to resume is received within the amount of time that 3D printing the object may be paused for.

3. A method, comprising:
    while an object is being three-dimensional (3D) printed according to a process, receiving an input indicative of a request to pause 3D printing the object;
    determining whether the process of 3D printing the object may be paused based at least in part on at least one of a characteristic of the object being 3D printed, a material being used to 3D print the object, or a characteristic of a 3D printer being used to 3D print the object, wherein determining whether the process of 3D printing the object may be paused based at least in part on the material being used to 3D print the object comprises: determining whether the process of 3D printing the object may be paused based at least in part on at least one of the 3D printer using a direct 3D printing technique, a binder 3D printing technique, a photopolymerization technique, or a sintering technique, and wherein determining whether the process of 3D printing the object may be paused based at least in part on the material being used to 3D print the object comprises: determining whether the process of 3D printing the object may be paused based at least in part on a rate at which the material hardens as it cures, and an ability to combine the material when heated with more of the material that is hardened;
    in response to determining that 3D printing the object may be paused, pausing the process of 3D printing the object; and
    in response to determining that 3D printing the object may not be paused, continue to 3D print the object according to the process.

4. The method of claim 3, wherein determining whether the process of 3D printing the object based at least in part on the characteristic of the object being 3D printed comprises:
    determining whether the process of 3D printing the object may be paused based at least in part on an effect on a structural integrity of the object associated with pausing 3D printing the object at a current progress in printing the object.

5. The method of claim 3, wherein determining whether the process of 3D printing the object may be paused based at least in part on the characteristic of the object being 3D printed comprises:
    determining whether the process of 3D printing the object may be paused based at least in part on a predetermined fault tolerance associated with the object deviating from a specification set forth in a corresponding 3D template.

6. The method of claim 3, further comprising:
    determining an amount of time that 3D printing the object may be paused for.

7. The method of claim 6, wherein determining the amount of time that 3D printing the object may be paused for comprises:
    determining the amount of time that 3D printing the object may be paused for based on a property of at least one material used to 3D print the object.

8. The method of claim 6, further comprising:
    receiving an indication to resume the process of 3D printing the object; and
    resuming the process of 3D printing the object in response to determining that the amount of time that 3D printing the object may be paused for has not yet elapsed.

9. The method of claim 3, further comprising:
receiving an indication to resume the process of 3D printing the object; and
resuming the process of 3D printing the object in response to determining that an alignment of the object relative to the 3D printer being used to 3D print the object is within a predetermined tolerance value.

10. The method of claim 3, further comprising:
receiving an indication to resume the process of 3D printing the object; and
raising an alert concerning resuming 3D printing the object in response to determining that an alignment of the object relative to the 3D printer being used to 3D print the object is outside of a predetermined tolerance value.

11. A non-transitory computer-readable storage medium for streaming a three-dimensional (3D) print job comprising a plurality of pieces to a 3D printer, bearing computer-readable instructions that, upon execution by a computing node, cause the computing node to perform operations comprising:
determining at least two pieces of the plurality of pieces in the 3D print job to be sent to the 3D printer across a communications network;
determining an order to send data corresponding to the at least two pieces based at least in part on whether a process of 3D printing at least one piece of the at least two pieces may be paused while it is being printed by the 3D printer, wherein determining whether the process of 3D printing the object may be paused based at least in part on the material being used to 3D print the object comprises: determining whether the process of 3D printing the object may be paused based at least in part on at least one of the 3D printer using a direct 3D printing technique, a binder 3D printing technique, a photopolymerization technique, or a sintering technique, and wherein determining whether the process of 3D printing the object may be paused based at least in part on the material being used to 3D print the object comprises: determining whether the process of 3D printing the object may be paused based at least in part on a rate at which the material hardens as it cures, and an ability to combine the material when heated with more of the material that is hardened;
sending the data corresponding to the at least two pieces to the 3D printer based on the determined order; and
continue to 3D print at least one object according to the process when the printing may not be paused.

12. The non-transitory computer-readable storage medium of claim 11, further bearing computer-readable instructions that, upon execution by the computing node, cause the computing node to perform operations comprising:
sending the 3D printer data corresponding to an unpausable piece of the plurality of pieces while sending the 3D printer data corresponding to a pausable piece of the plurality of pieces, the 3D printer queuing the data corresponding to the unpausable piece while 3D printing the pausable piece.

13. The non-transitory computer-readable storage medium of claim 11, wherein determining the order to send data corresponding to the at least two pieces comprises:
determining the order to send data corresponding to the at least two pieces based on an amount of available bandwidth between the computing node and the 3D printer, an amount of data corresponding to at least one piece of the at least two pieces, or an amount of time calculated to print at least one piece of the at least two pieces with the 3D printer.

14. The non-transitory computer-readable storage medium of claim 11, further bearing computer-readable instructions that, upon execution by the computing node, cause the computing node to perform operations comprising:
sending the 3D printer data corresponding to a pausable piece of the plurality of pieces, the 3D printer beginning to print the pausable piece before sending the 3D printer the data corresponding to the pausable piece is completed.

15. The non-transitory computer-readable storage medium of claim 11, further bearing computer-readable instructions that, upon execution by the computing node, cause the computing node to perform operations comprising:
sending the 3D printer data corresponding to an unpausable piece of the plurality of pieces, the 3D printer waiting to begin to print the unpausable piece until after sending the 3D printer the data corresponding to the unpausable piece is completed.

16. The non-transitory computer-readable storage medium of claim 15, further bearing computer-readable instructions that, upon execution by the computing node, cause the computing node to perform operations comprising:
sending the 3D printer data corresponding to an unpausable piece of the plurality of pieces, the 3D printer waiting to begin to print the unpausable piece until after sending the 3D printer the data corresponding to the unpausable piece is completed based at least in part on a determination of an amount of time involved with printing the unpausable piece, a reliability of a network connection between the computing node and the 3D printer, a time at which printing the unpausable piece is to be completed, a cost of a material associated with printing the unpausable piece, or an availability of the material associated with printing the unpausable piece.

17. The non-transitory computer-readable storage medium of claim 11, further bearing computer-readable instructions that, upon execution by the computing node, cause the computing node to perform operations comprising:
receiving an indication from the 3D printer that the 3D printer lost or did not receive data corresponding to a first object of the at least two objects; and
in response to receiving the indication, re-sending the 3D printer data corresponding to the first object.

18. The non-transitory computer-readable storage medium of claim 11, wherein whether a first piece of the plurality of pieces may be paused is based at least in part on whether the process of 3D printing the first piece may be suspended in response to receiving user input requesting a pause or in response to an interruption in the process of 3D printing the first piece, and the process of 3D printing the first piece may later be resumed.

* * * * *